US012324993B1

(12) United States Patent
Alnaimat et al.

(10) Patent No.: US 12,324,993 B1
(45) Date of Patent: Jun. 10, 2025

(54) DIRECT SOLAR DESALINATION WITH ATOMIZED DROPLETS AND HEAT RECOVERY

(71) Applicant: United Arab Emirates University, Al Ain (AE)

(72) Inventors: Fadi Alnaimat, Al Ain (AE); Bobby Mathew, Al Ain (AE); Mohammed Ziauddin, Al Ain (AE)

(73) Assignee: UNITED ARAB EMIRATES UNIVERSITY, Al-Ain (AE)

(*) Notice: Subject to any disclaimer, the term of this patent is extended or adjusted under 35 U.S.C. 154(b) by 0 days.

(21) Appl. No.: 18/606,168

(22) Filed: Mar. 15, 2024

(51) Int. Cl.
| | | |
|---|---|---|
| *C02F 1/12* | (2023.01) | |
| *B01D 1/00* | (2006.01) | |
| *B01D 1/16* | (2006.01) | |
| *B01D 3/00* | (2006.01) | |
| *B01D 5/00* | (2006.01) | |
| *C02F 1/04* | (2023.01) | |

(Continued)

(52) U.S. Cl.
CPC ............ *B01D 1/0035* (2013.01); *B01D 1/16* (2013.01); *B01D 3/006* (2013.01); *B01D 5/0027* (2013.01); *B01D 5/006* (2013.01); *C02F 1/048* (2013.01); *C02F 1/12* (2013.01); *C02F 1/14* (2013.01); *C02F 1/18* (2013.01); *C02F 2103/08* (2013.01); *C02F 2201/009* (2013.01); *C02F 2303/10* (2013.01)

(58) Field of Classification Search
CPC ...... C02F 1/14; C02F 1/12; C02F 1/36; C02F 1/04–18; B01D 1/0035; B01D 1/16; B01D 1/18; B01D 1/20
See application file for complete search history.

(56) References Cited

U.S. PATENT DOCUMENTS 3,860,492 A * 1/1975 Lowi, Jr. .................. C02F 3/10
159/13.1
4,338,922 A * 7/1982 Moore .................... F24S 20/30
126/714

(Continued)

FOREIGN PATENT DOCUMENTS

CN        106830149 A  *  6/2017

OTHER PUBLICATIONS

Espacenet English Language Tranlsation of CN-106830149-A.*

*Primary Examiner* — Jonathan Luke Pilcher
(74) *Attorney, Agent, or Firm* — MH2 Technology Law Group, LLP (57) ABSTRACT

There is disclosed a portable direct solar desalination system, comprising a solar receiver and evaporator unit comprising inlet and outlet ports for incoming and outgoing water and air; an ultrasonic atomizer unit positioned within the solar receiver and evaporator unit for generating atomized droplets inside the solar receiver and evaporator unit; wherein air flows into the solar receiver and evaporator unit via the inlet port, thereby carrying the atomized droplets through the solar receiver and evaporator unit, wherein entrained droplets of the air-droplet mixture are exposed to solar radiations falling on the solar receiver and evaporator unit, which enables the atomized droplets to directly capture the incident solar radiations, leading to droplets evaporation, thereby producing freshwater. Also disclosed is a process of solar desalination comprising directly capturing solar energy by atomized water droplets in a solar evaporator.

14 Claims, 7 Drawing Sheets

$T_{onar}$ - Dehumidifier Outlet Temperature   $T_{MOT}$ - humidifier Outlet Temperature   $T_{ROT}$ - Recovery Outlet Temperature
$T_{MT}$ - Mist Temperature                   $T_{xxx}$ - Saltwater Temperature           $T_{FW}$ - Freshwater Temperature
$RH_{RO}$ - Recovery Outlet RH%               $RH_{HO}$ - Humidifier Outlet RH%            $RH_{xx}$ - Humidifier Outlet RH%

(51) Int. Cl.
*C02F 1/14* (2023.01)
*C02F 1/18* (2023.01)
*C02F 103/08* (2006.01)

(56) References Cited

U.S. PATENT DOCUMENTS

| | | | | |
|---|---|---|---|---|
| 5,650,050 | A * | 7/1997 | Kaufmann | C02F 1/14 |
| | | | | 203/DIG. 1 |
| 6,500,216 | B1 * | 12/2002 | Takayasu | C02F 1/06 |
| | | | | 23/303 |
| 6,919,000 | B2 * | 7/2005 | Klausner | C02F 1/14 |
| | | | | 210/150 |
| 7,225,620 | B2 * | 6/2007 | Klausner | C02F 1/16 |
| | | | | 60/641.1 |
| 7,347,889 | B2 * | 3/2008 | Matsuura | B01D 17/04 |
| | | | | 261/78.2 |
| 9,623,344 | B2 * | 4/2017 | Bosch | C02F 1/14 |
| 11,345,612 | B2 * | 5/2022 | Petrisca | C02F 1/042 |
| 11,554,970 | B2 * | 1/2023 | Samad | B01D 1/14 |
| 11,597,660 | B2 * | 3/2023 | Al-Mutairi | B01D 5/006 |
| 11,807,552 | B2 * | 11/2023 | Petrisca | B01D 5/006 |
| 2003/0033805 | A1 * | 2/2003 | LaViolette | F24S 10/25 |
| | | | | 60/641.8 |
| 2011/0266132 | A1 * | 11/2011 | Takezaki | B01D 1/0052 |
| | | | | 202/233 |
| 2012/0085635 | A1 * | 4/2012 | Haynes | C02F 1/06 |
| | | | | 202/185.1 |
| 2022/0127165 | A1 * | 4/2022 | Jiang | B01D 1/16 |

* cited by examiner

DIRECT SOLAR DESALINATION WITH ATOMIZED DROPLETS AND HEAT RECOVERY

FIELD OF THE INVENTION

The present invention relates to the field of solar desalination, and more particularly to a portable and direct solar thermal desalination system for producing high-quality freshwater for decentralized applications.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

The continuous increase in population is leading to the depletion of freshwater resources in many areas of the world, resulting in the increased proliferation of desalination plants. Among the various desalination approaches, thermal and membrane desalination methods have been widely and successfully implemented over the past few decades. The commercially available thermal desalination systems include Multi-effect Desalination (MED), Multi-stage Flashing (MSF) and Vapour Compression Distillation (VCD), while the commercially available non-thermal systems are membrane desalination systems such as Reverse Osmosis (RO) systems. These desalination methods are energy intensive and much research is being done to find energy efficient methods of desalinating water. The energy required for a desalination process depends on many factors including the salinity of the seawater, the purity of the fresh water required, the desalination method used by the plant and the capacity of the desalination plant.

Although SWRO is the most energy efficient commercial seawater desalination technology, it still requires large amounts of energy. For most systems, electrical energy accounts for approximately 35% to 40% of total operating costs. Energy recovery devices (ERDs) can reduce energy consumption by up to 60%. As of 2018, there are about 5,300 seawater desalination plants in operation, with a total global desalination capacity of about 58 million cubic metres per day. Although seawater reverse osmosis (SWRO) is the most widely used desalination technology, it has several drawbacks, including the production of a brine stream, the need for seawater intakes, and its high energy requirements.

In the case of small or portable solar thermal desalination system, the energy consumption is very low because no external equipment such as high pressure pumps or fans are used. In recent literature related to solar thermal desalination studies, it is observed that evaporation enhancement with localised evaporation is widely considered. The evaporation enhancement is achieved by using ultrasonic atomiser inside the solar receiver with entrained droplets to directly capture the solar energy and use it for evaporation. The operation of solar thermal desalination is characterised by low cost, low maintenance and applicability to high salinity water compared to RO and other similar techniques. Recent developments in the improvement of solar thermal desalination is observed with the rapid development of new photothermal material as well as photothermal construction.

Analysis of related prior art in the field of solar thermal desalination system showed discussions of a centrifugal wet type air conditioner utilizing water which generates mist. The water is used as mist for cleaning the polluted air. The objective of this invention is to purify air or gases using a humidified vapor generated by a vortex. In another prior art, a method and apparatus for desalination is configured to atomize a solid-bearing liquid to produce a hot humid gas containing dissolved solids. The apparatus uses a cyclone separator to separate the solids. A heater is used to heat the humid gas received from the exit port of the gas-solid separator, and a condenser configured to receive heated humid gas from the heater and to condense solids-free liquid. Also disclosed is a device for humidification is proposed for room air conditioning and energy transfer especially for application with contaminated saltwater. The purpose is to use contaminated water with for cooling, and uses water film on an inclined collector surface. In another reference, there is described a sea water desalting device, particularly powered by a kind of sun energy optically focused-wind energy synergistic supersonic wave sea water. There is a pressurized air and water tanks. The air pressurizing and energy storing device of the wind turbine and the heat storage and assistant heating device are respectively connected with an atomizing and humidifying device. Another reference discloses a hydro-thermal exchange unit (HTEU) for desalinating feed water in accordance with a humidification-de humidification includes feed water, fresh water and gas conduit circuits for transporting feed water, fresh water, and gas, respectively. There are several components including evaporator, condenser and heat exchanging unit stacked and connected.

Based on the above explained, there exists a need for a better thermal desalination system, which overcomes the drawbacks of the traditionally employed systems.

SUMMARY OF THE INVENTION

Therefore it is an object of the present invention to propose a portable and direct solar thermal desalination system, which is proved to be cost-effective and requires low maintenance.

There is disclosed a portable direct solar desalination system, comprising a solar receiver and evaporator unit comprising inlet and outlet ports for incoming and outgoing water and air; an ultrasonic atomizer unit positioned within the solar receiver and evaporator unit for generating atomized droplets inside the solar receiver and evaporator unit; wherein air flows into the solar receiver and evaporator unit via the inlet port, thereby carrying the atomized droplets through the solar receiver and evaporator unit, wherein entrained droplets of the air-droplet mixture are exposed to solar radiations falling on the solar receiver and evaporator unit, which enables the atomized droplets to directly capture the incident solar radiations, leading to droplets evaporation, thereby producing freshwater.

In an embodiment of the present invention, solar radiations falling on a top transparent cover of the solar receiver and evaporator unit.

In another embodiment of the present invention, ultrasonic waves produced by high frequency vibrating membranes of the ultrasonic atomizer unit produces a plurality of micro-droplets within the solar receiver and evaporator unit.

In another embodiment of the present invention, the solar receiver and evaporator unit is a basin/chamber filled up to a certain specific depth with seawater from a seawater tank.

In another embodiment of the present invention, the ultrasonic atomizer unit comprises a plurality of ultrasonic atomizers immersed in the basin/chamber for atomizing the seawater filled up inside of the basin/chamber.

In another embodiment of the present invention, the solar receiver and evaporator unit is a combined/single solar receiver and evaporator unit.

In another embodiment of the present invention, the portable direct solar desalination system further comprises a direct contact condenser in connection with the solar receiver and evaporator unit, and a heat recovery unit.

In another embodiment of the present invention, humidified air flows out of solar receiver and evaporator unit and the enters the heat recovery unit which enables heat from the humidified air to be transferred by a heat exchanger in the heat recovery unit to seawater/saline water stored in a seawater tank.

In another embodiment of the present invention, the heat exchanger is in the shape of a helical tube or in the form of air-liquid heat exchangers with fins.

In another embodiment of the present invention, condensed vapor in the heat recovery unit is sent to a freshwater tank.

In another embodiment of the present invention, the direct contact condenser comprises a plurality of water spray nozzles for distributing cold freshwater, enabling a direct contact vapor condensation, wherein freshwater droplets from the plurality of water spray nozzles trickle down by gravity and exchange heat with the incoming air-droplet mixture, leading to condensation.

In another embodiment of the present invention, air is circulated between the solar receiver and evaporator unit and the direct contact condenser via a single or multiple fans, wherein flow rate of the circulated air is optimally set to ensure there is minimal pressure drop and enough flow to entrap droplets in the solar receiver and evaporator unit.

In another embodiment of the present invention, a filter is used at the outlet port of the solar receiver and evaporator unit to allow passage of only air-vapor mixture, and to prevent any seawater droplets from leaving, thereby ensuring minimal salt movement out of the solar receiver and evaporator unit.

In another embodiment of the present invention, wherein solar receiver and evaporator unit further comprises an array of perforated metallic plates for absorbing solar energy and transferring absorbed heat to the entrained droplets of the air-droplet mixture.

As another aspect of the present invention, a process of solar desalination is disclosed, comprising directly capturing solar energy by atomized water droplets in a solar evaporator; wherein air flowing into the solar evaporator carries the atomized droplets through the solar evaporator, wherein entrained droplets of the air-droplet mixture are exposed to solar radiations falling on the solar evaporator, which enables the atomized droplets to directly capture the incident solar radiations, leading to droplets evaporation, thereby producing freshwater; and circulating air-vapor mixture within the solar evaporator to maintain a continuous freshwater yield.

In another embodiment of the present invention, air entering the solar evaporator gets heated and humidified within the solar evaporator and makes its way to a direct contact condenser chamber.

In another embodiment of the present invention, the solar evaporator further comprises a mesh shaped structure for absorbing solar energy and transferring absorbed heat to the entrained droplets of the air-droplet mixture.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

The aspects of the proposed portable and direct solar thermal desalination system-according to the present invention will be described in conjunction with FIGS. 1-7. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention proposes a portable direct solar thermal desalination system for producing high-quality freshwater for decentralized applications. The desalination system is developed with a single unit design that operates independently without any need of thermal heating. The system utilizes solar energy to be captured by the entrained droplets and get heated directly by the solar radiation which improves the rate of evaporation. It is cost-effective and requires very less maintenance. In an embodiment of the present invention, the proposed portable direct solar thermal desalination system is best adapted to serve regions with abundant solar energy.

The significance of the invention is the design development of a solar powered desalination process operating in a single unit design with improved performance. The significance of the desalination process is the inclusion of the ultrasonic atomiser in the direct solar evaporator chamber, which improves water evaporation. The desalination process is designed and achieved with the aim of low cost and high quality freshwater production using renewable energy is proposed. Unlike other desalination systems that use photovoltaic (PV) panels to convert solar energy into electricity and then use it for desalination through reverse osmosis (RO) technology. The aim of this invention is to capture solar energy to produce fresh water using a single desalination unit. The solar desalination unit is powered solely by solar energy and operates independently. The desalination process is achieved via direct capturing of solar energy by atomized water droplets in an evaporator component.

A portable direct solar thermal desalination system for producing high-quality freshwater for decentralized applications is proposed. The desalination system is developed with a single unit design which operates independently without any need of thermal heating. The primary objective of this invention is to directly capture solar energy to produce freshwater using a single desalination unit. The single unit comprises a solar receiver and evaporator combined as a single unit with an ultrasonic atomizer positioned inside of the solar evaporator for generating droplets. The enhancement of evaporation is achieved through the use of the ultrasonic atomizer inside the solar receiver with entrapped droplets for directly capturing incident solar rays/ solar energy and thereby used for evaporation.

The desalination process is achieved through direct solar energy capturing by atomized water droplets in the evaporator, and air flows in the solar evaporator receiver to carry the atomized droplets and enhance heat transfer. A fan is used to create an airflow at different velocity. Air-vapor mixture is circulated within the desalination unit to maintain higher freshwater production yield, and a direct contact condenser is cooled using a lower temperature fluid to achieve higher freshwater production and desalination efficiency. The circulated air is humid and at a higher temperature leading to lower thermal energy requirement and higher freshwater production yield.

In another embodiment of the present invention, air enters the condenser through the bottom via a perforated pipe and flows upward. The condenser includes water spray nozzles to distribute the cold fresh water enabling a direct contact vapor condensation and cooling. Freshwater droplets from the nozzles trickle down by gravity and exchange heat with the incoming air-vapor mixture leading to condensation. The condenser contains a basin to collect fresh water, and the fresh water is re-circulated by a freshwater pump in the condenser (and may also be cooled externally to enhance the heat transfer). If the amount of fresh water in the bottom basin exceeds a certain level, it is directed to the drain in the freshwater storage tank.

A heat recovery unit is used to recover the heat from the air-vapor to heat the seawater and pre-cool the air-vapor to achieve higher freshwater production and desalination efficiency. The purpose of the heat recovery is to primarily capture the thermal energy for pre-heating the saline water in the seawater tank which is eventually be sent to the solar receiver. It is also used to pre-cool the humidified air-vapor mixture which causes some vapor to condense in the heat recovery and also reduces the cooling requirement in the condenser. The condensed vapor in the heat recovery unit is sent to the freshwater tank. In another embodiment, a mesh structure/plurality of perforated plates is further installed inside the solar-evaporator for further solar energy capturing and heating of the air-vapor mixture.

Figure 1:
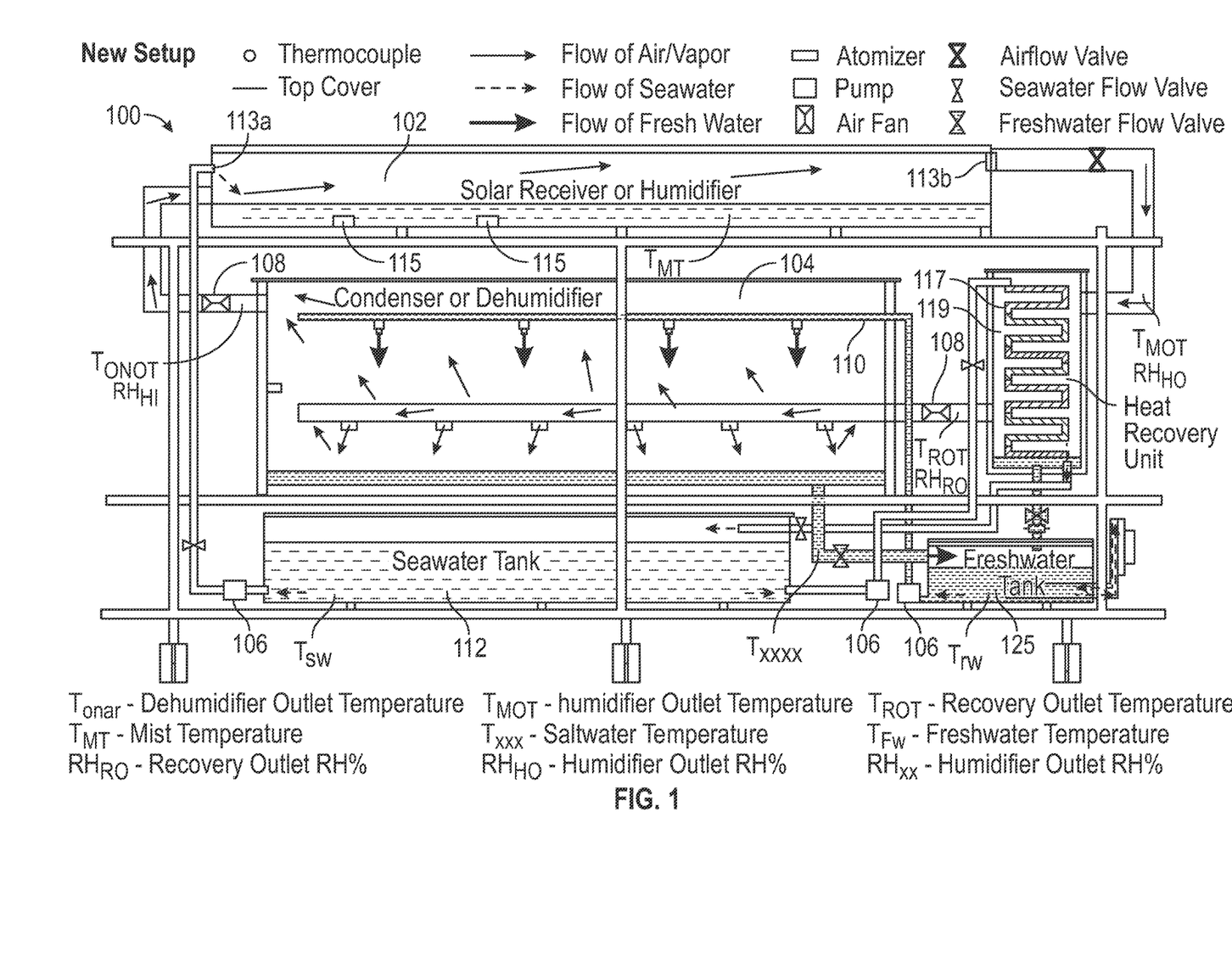
FIG. 1 shows the proposed desalination unit, in accordance with the present invention consists mainly of a solar-evaporator receiver chamber 102 and condenser chamber 104.

The solar receiver and evaporator are combined in a single unit for direct solar energy capturing and evaporation and an ultrasonic atomizer is used inside of the solar evaporator to generate droplets. Solar radiations are captured directly by the atomized droplets inside the solar receiver, and a mesh structure is installed inside the solar-evaporator for further solar energy capturing and heating of the air-vapor mixture. Air flows in the solar evaporator receiver to carry the atomized droplets and enhance heat transfer, and a fan is used to create an airflow at a different velocity. Air-vapor mixture is circulated within the desalination unit to maintain higher temperature in the solar-evaporator section, which prevents heat losses or contamination from outside air. The air is humid and at a higher temperature within the evaporator chamber, leading to lower thermal energy requirement and higher freshwater production yield. A direct contact condenser is used and cooled by a lower temperature freshwater to achieve higher condensation, freshwater production, and desalination efficiency. A heat recovery unit is used before the condenser section to recover the heat from the air-vapor mixture to achieve pre-heating for the seawater and pre-cooling for the air-vapor. This leads higher freshwater production and desalination efficiency. The proposed desalination unit, in accordance with the present invention consists mainly of a solar-evaporator receiver chamber 102 and condenser chamber 104 as shown in FIG. 1.

Figure 2A:
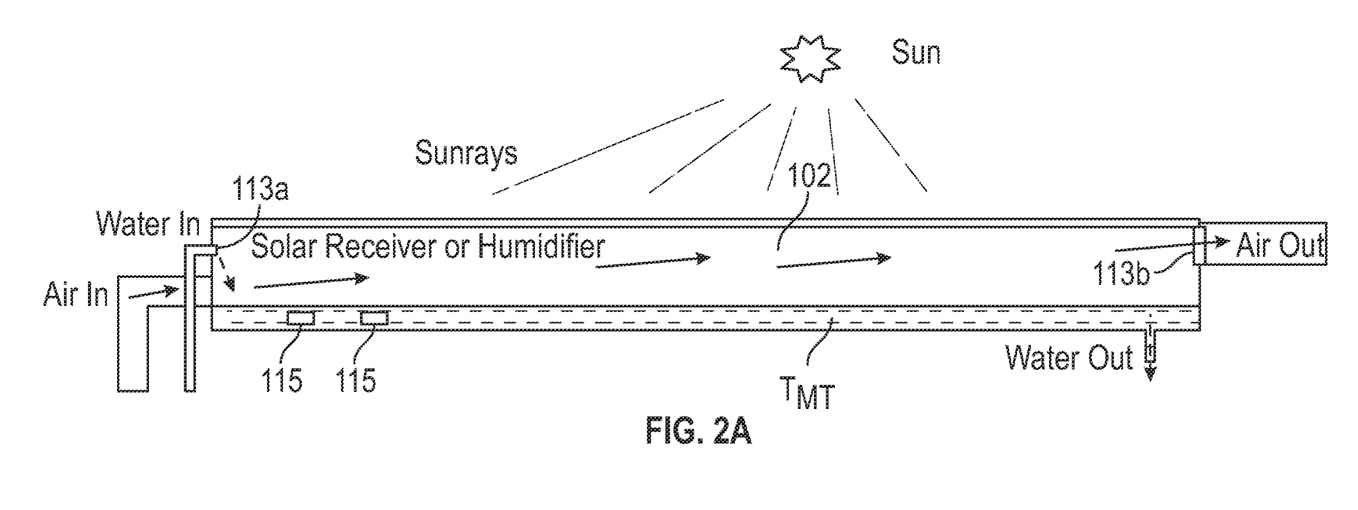
FIG. 2A is a detailed schematic of the direct solar evaporator with an ultrasonic atomizer (without a mesh), in accordance with the present invention.

In another embodiment, there are other components including one or more circulating pumps 106, fan with circulating air 108 and a plurality of water pipes 110. The solar-evaporator chamber 102 is basically a flat-bottom or a non-flat bottom basin filled up to a certain specific depth with seawater from a seawater tank 112. The solar-evaporator chamber 102 has a top transparent cover and inlet and outlet ports (113a and 113b) for incoming and outgoing seawater and air. The solar-evaporator chamber 102 further includes one or more ultrasonic atomizers 115 immersed in the chamber basin to atomize the seawater/saline water filled up inside of the chamber 102. Ultrasonic waves produced by high frequency vibrating membranes of the ultrasonic atomizer 115 cause a plurality of micro-droplets within the solar-evaporator chamber 102. The water inlet 113a to the solar evaporator chamber 102 functions primarily to replenish the evaporated seawater, either by allowing seawater to flow continuously into the solar-evaporator chamber 102 or once the seawater level is seen to have reduced below a certain pre-determined limit/level. In another embodiment, air flows into the solar evaporator chamber 102, which allows air to carry the atomized droplets within the chamber 102. The entrapped droplets of the air-droplet mixture are exposed to the solar radiations falling on the top transparent cover of the solar-evaporator chamber 102 which enables the droplets to directly capture the solar energy, leading to droplets evaporation as shown in FIG. 2A.

Figure 2B:
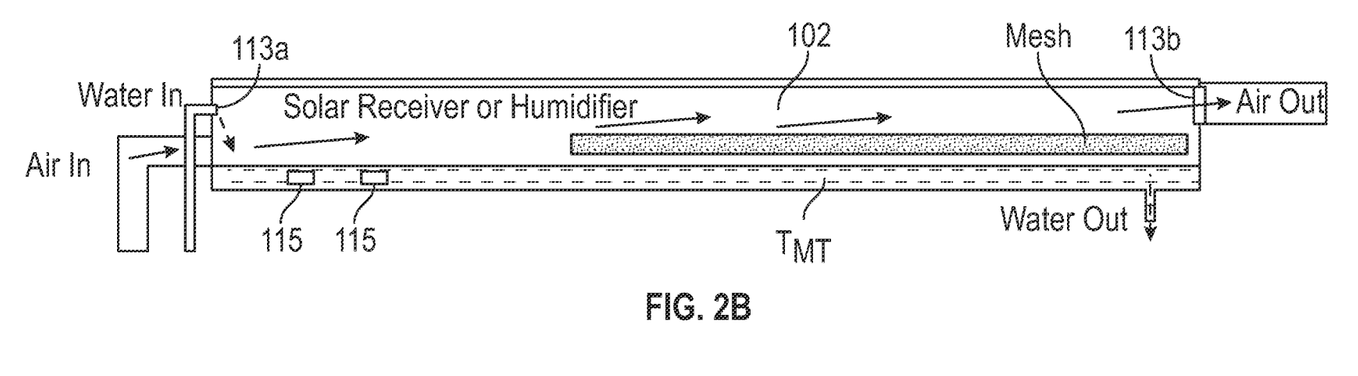
FIG. 2B is a detailed schematic of the direct solar evaporator with an ultrasonic atomizer (with a mesh), in accordance with the present invention.
Figure 2C:
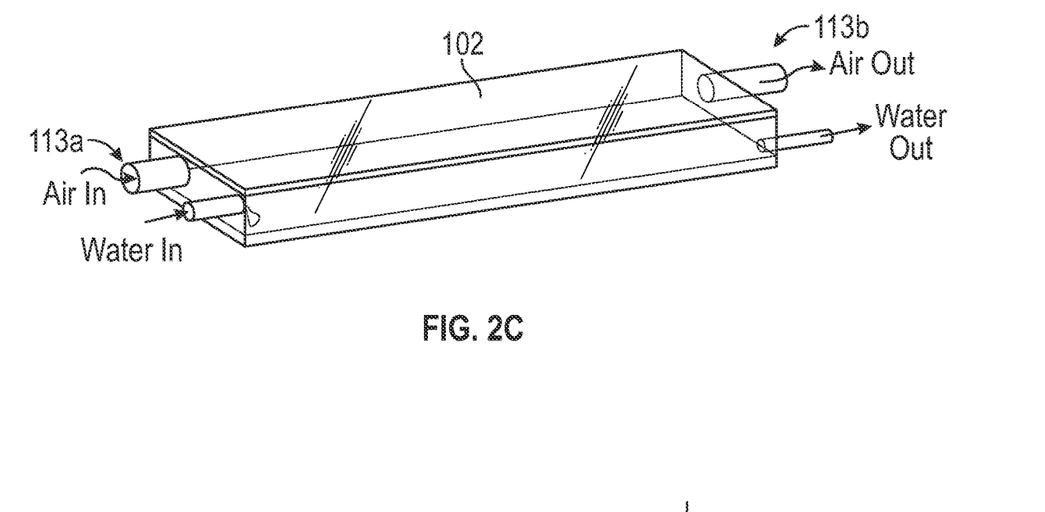
FIG. 2C shows a 3D schematic of the solar-evaporating chamber 102 with water and air inlets and outlets, 113a and 113b, in accordance with the present invention.

Air enters the solar-evaporator chamber 102 at a lower temperature and humidity and gets heated and humidified within the solar-evaporator chamber 102. Accordingly, the air exits the evaporator chamber 102 at a higher temperature and humidity and makes its way to the direct contact condenser/condenser chamber 104. In another embodiment of the present invention, the solar-evaporator 102 includes a mesh shaped structure (an array of perforated metallic plates) 117 inside the solar evaporator which is used to absorb solar thermal energy and transfer the absorbed heat to the flowing air-vapor and droplets in the solar evaporating chamber. The inclusion of the mesh structure 117 as shown in FIG. 2B improves the evaporation of the droplets as the structure captures the incident solar energy and further heats the air-vapor mixture inside the solar chamber. This leads to improving the solar energy absorption efficiency. FIG. 2C shows a 3D schematic of the solar-evaporating chamber 102 with water and air inlets and outlets, 113a and 113b, in accordance with the present invention.

Figure 3A:
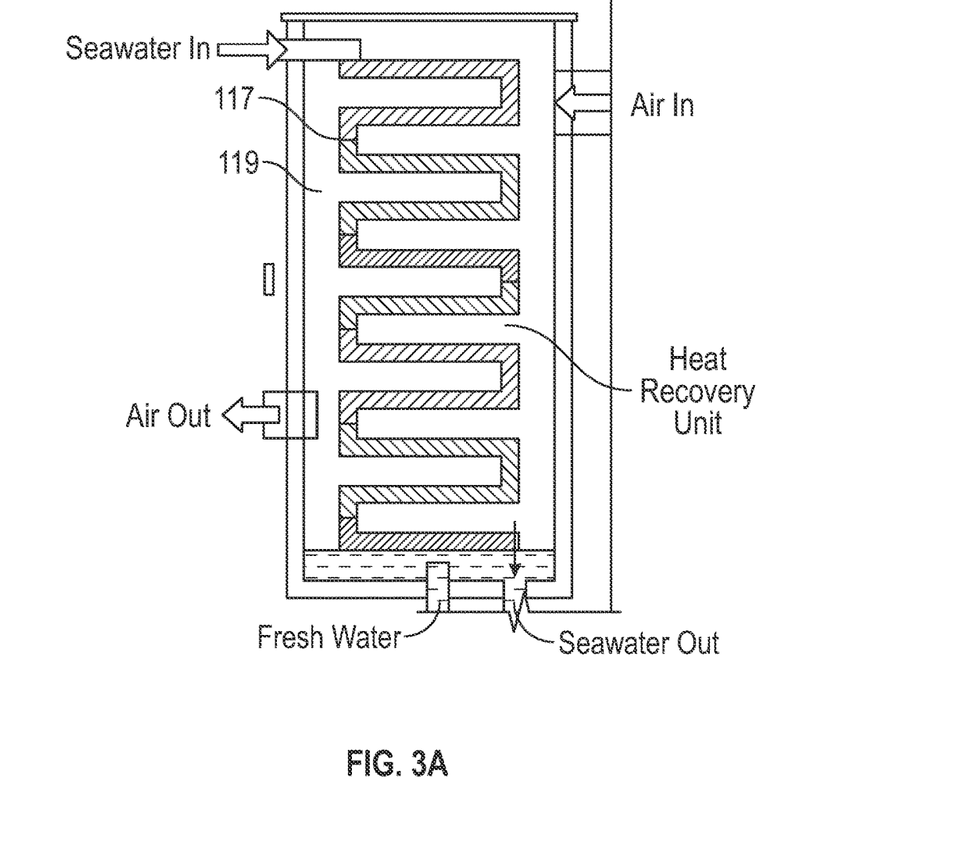
FIGS. 3A and 3B are detailed schematic diagrams of the proposed heat recovery unit in 2D and 3D, respectively.
Figure 3B:
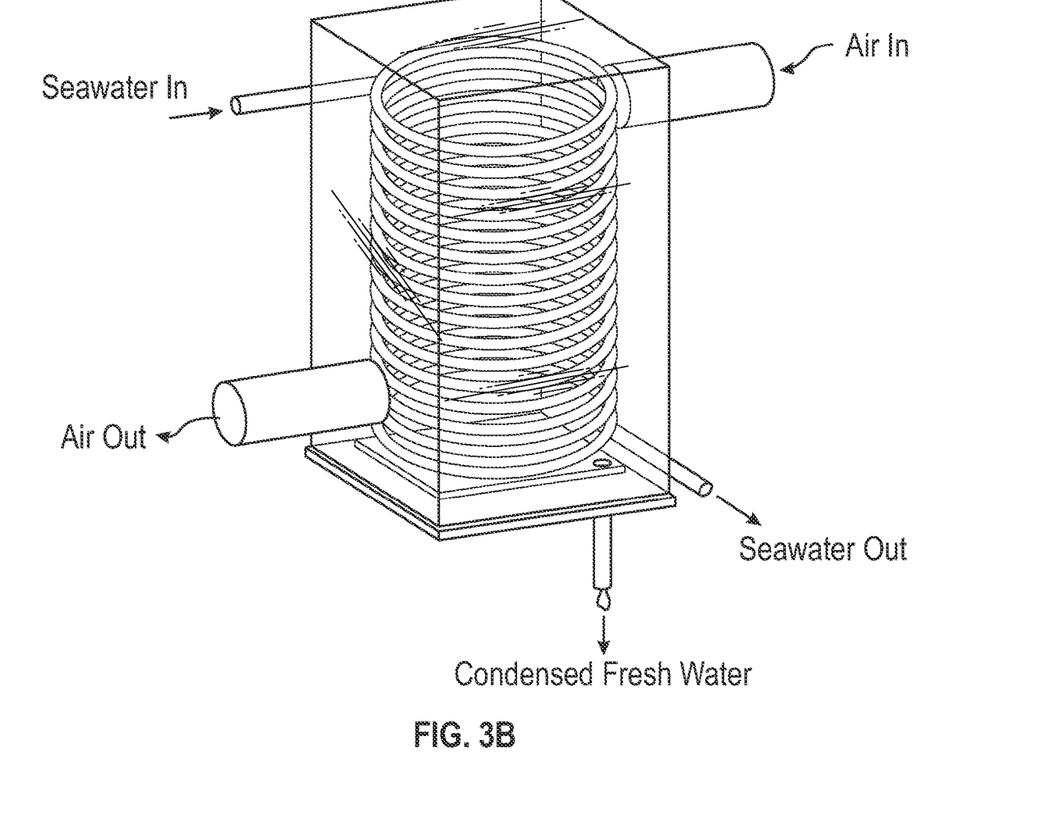

In another embodiment, the humidified air flows out of the solar-evaporator chamber 102 and the enters the heat recovery unit 119 which enables some heat to be transferred by a heat exchanger 120 to saline water stored in the seawater tank 112. The heat exchanger 120 in the heat recovery unit 119 is in the shape of a helical tube or in the form of air-liquid heat exchangers with fins as shown in FIG. 3.

The saline water is drawn from the seawater storage tank 112 by a pump and flows into the heat recovery unit 119. As the temperature of the saline water is lower than the temperature of the humidified air/air-vapor mixture, heat transfer occurs which causes the air-vapor to be cooled and condensed. The purpose of the heat recovery is to capture the thermal energy for pre-heating the saline water in the seawater tank 112 which will eventually be sent to the solar-evaporator chamber 102. This is also used to pre-cool the humidified air/air-vapor mixture which causes some of vapor to condense in the heat recovery and reduces the cooling requirement in the condenser. Both of these objectives lead to improving the overall thermal efficiency of the solar-evaporator chamber 102 and the direct contact condenser/condenser chamber 104. The condensed vapor in the heat recovery unit 119 is sent to the freshwater tank 125. After leaving the heat recovery unit 119, the humidified air-vapor mixture enters the direct contact condenser/condenser chamber 104. The condenser 104 is a chamber that allows air to flow upwards and cold fresh water is sprayed from the top to flow downwards in a counter-current manner. The humidified air thereby is further cooled and dehumidified in the condenser 104 which results in vapor condensation and fresh-water production. The detailed arrangement of the circulating air-vapor flow in accordance with the desalination process, and freshwater circulation in the condenser 104 and freshwater tank 125 is shown in the FIG. 1. The air is circulated between the solar-evaporator receiver chamber 102 and condenser chamber 104 via a single or multiple fans. The flow rate is optimally set to ensure there is minimal pressure drop and enough flow to entrap the droplets in the solar evaporator chamber 102.

FIG. 2 shows detailed 3D views of the various stages of the solar evaporator chamber 102 in the desalination system. The seawater at the bottom of the basin is maintained at a certain level to achieve continuous and unified atomization of the droplets. There is a cavity or space in the solar evaporator chamber 102 located above the water surface to allow generated droplets to move upward so that they may be entrained by the moving air above the water surface. Therefore, this allows droplets to flow in the direction of the air flow. The water level above the atomizer needs to be at a specific height to allow the droplets to be generated continuously.

In another embodiment, a filter is used at the outlet of the solar-evaporator chamber 102 to allow only air-vapor mixture, and to prevent any seawater droplets from leaving which ensure there is no salt movement out of the solar-evaporator chamber 102. The remaining seawater in the solar-evaporator chamber 102 becomes more saline over time due to water evaporation, and this saline water is discharged at the end of the day via a drainage port.

Figure 4A:
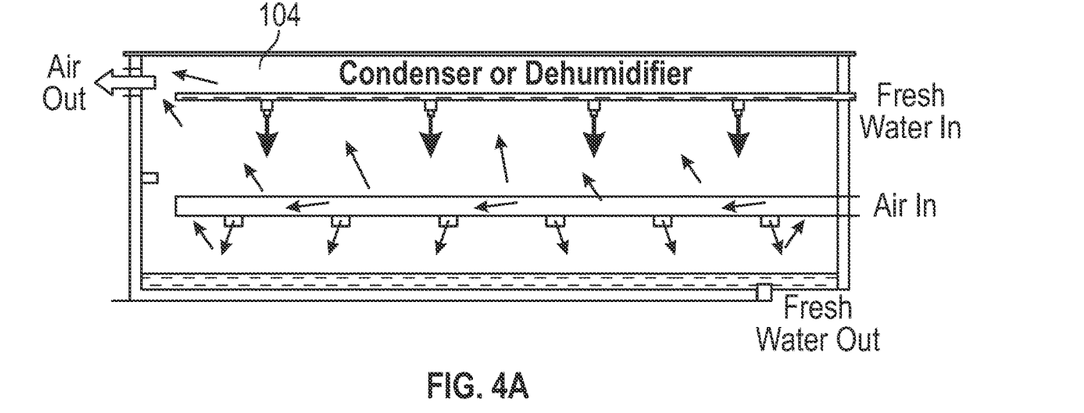
FIGS. 4A and 4B are detailed schematic diagrams of the proposed direct contact condenser with freshwater collection process in 2D and 3D, respectively.
Figure 4B:
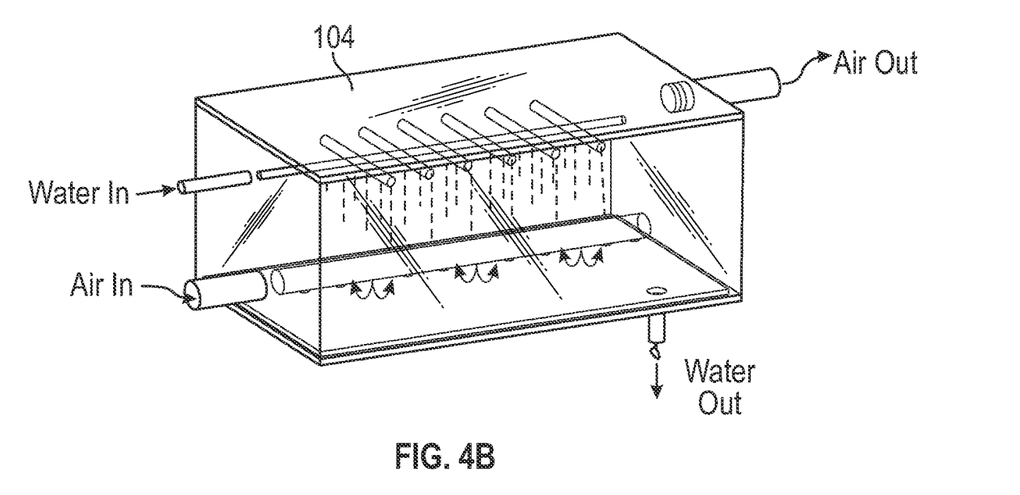

The condenser (dehumidifier) 104 in accordance with the present invention is shown in FIG. 4. It is observed that air enters the condenser 104 through the bottom through a perforated pipe and flows upward. The condenser 104 includes water spray nozzles to distribute the cold fresh water enabling a direct contact vapor condensation and cooling. The freshwater droplets from the nozzles trickle down by gravity and exchange heat with the incoming air-vapor mixture leading to condensation. The condenser 104 further contains a basin to collect fresh water. The fresh water is re-circulated by a freshwater pump in the condenser and is cooled externally to enhance the heat transfer. If the amount of fresh water in the bottom basin exceeds a certain level, it is directed to a drain in the freshwater storage tank 125.

Figure 5:
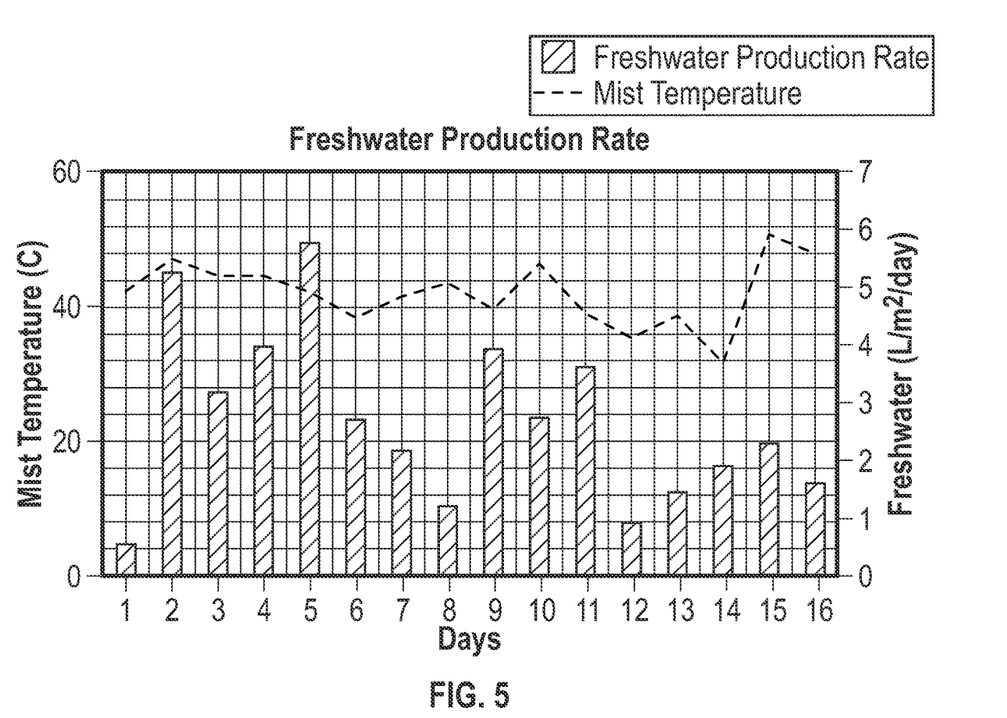
FIG. 5 shows the freshwater production rates and the mist droplet temperature.
Figure 6A:
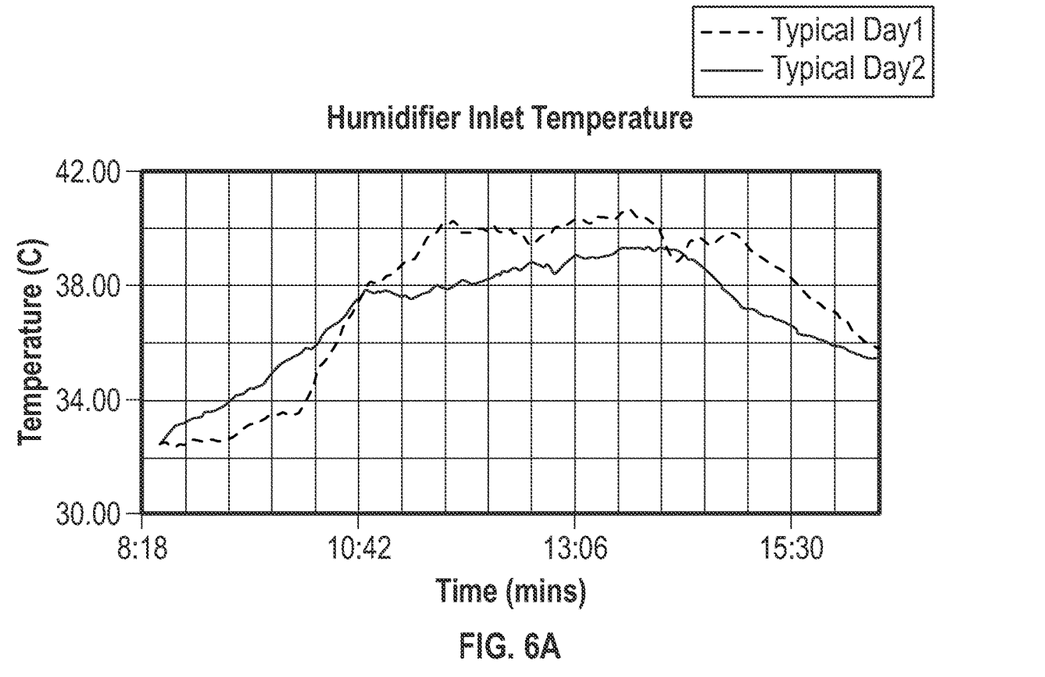
FIGS. 6A and 6B show solar-evaporator (humidifier) inlet and outlet air-vapor temperatures.
Figure 6B:
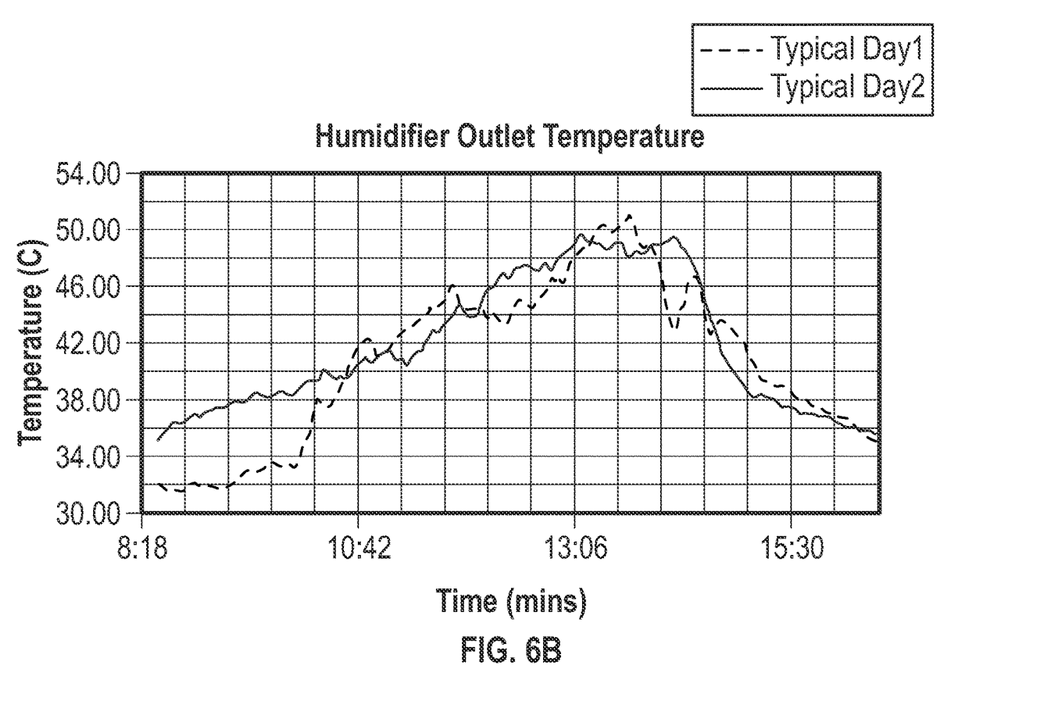
Figure 7A:
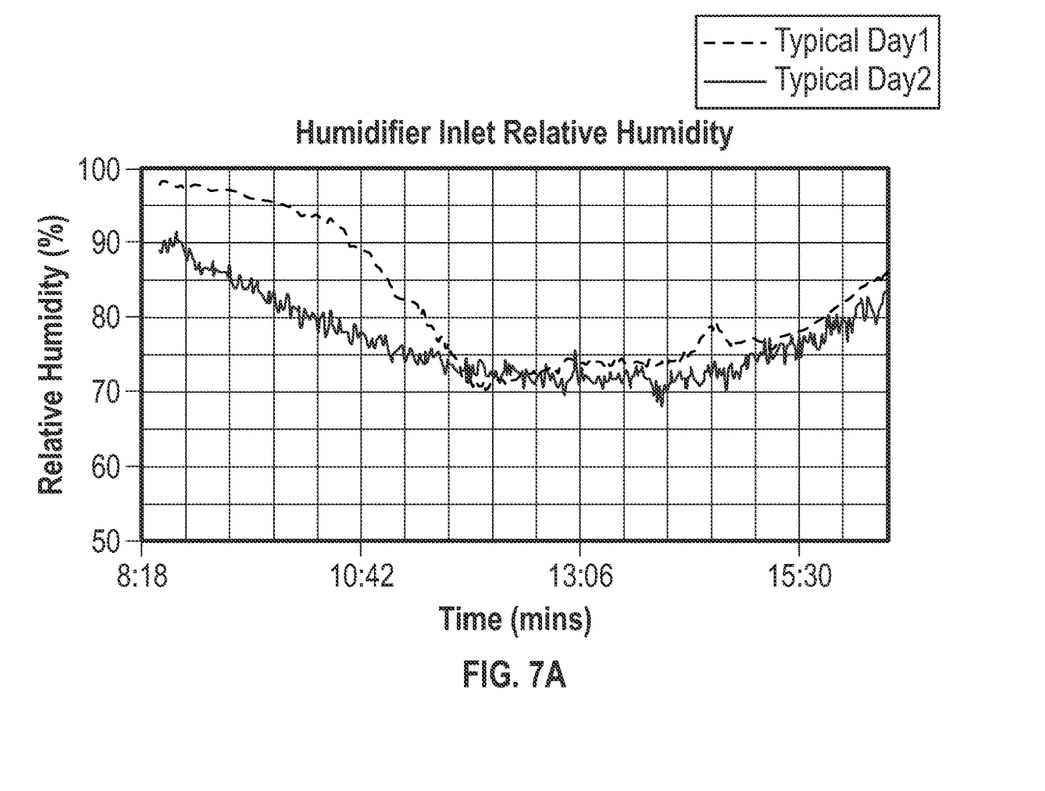
FIGS. 7A and 7B show the solar-evaporator (humidifier) inlet and outlet air relative humidity.
Figure 7B:
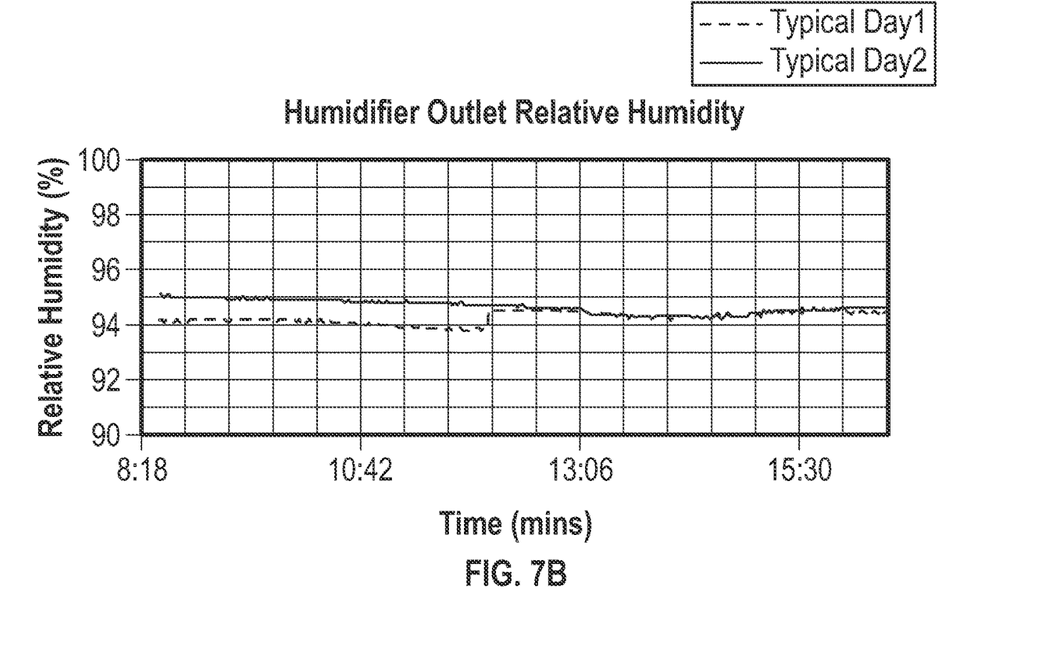

In an embodiment of the present invention, an experimental setup is developed for the experimental testing of the proposed desalination process. The experiment is carried out in the presence of direct solar radiations. The air flow rate and water flow rates are maintained constant through the experimental testing. FIG. 5 shows the freshwater production rates and the mist droplet temperature. FIGS. 6A and 6B show solar-evaporator (humidifier) inlet and outlet air-vapor temperatures, and FIGS. 7A and 7B show the solar-evaporator (humidifier) inlet and outlet air relative humidity.

An important distinction of this desalination method from traditionally implemented systems is direct solar energy being captured by the generated droplets inside the solar receiver and also the inclusion of a mesh shaped structure (perforated plates) within the solar evaporator chamber which contributes to higher solar energy absorption efficiency. In addition, there is a circulation of the air-vapor mixture from the solar evaporator and the direct contact condenser with heat recovery unit.

As another aspect of the present invention, a process of solar desalination is disclosed, comprising directly capturing solar energy by atomized water droplets in a solar evaporator; wherein air flowing into the solar evaporator carries the atomized droplets through the solar evaporator, wherein entrained droplets of the air-droplet mixture are exposed to solar radiations falling on the solar evaporator, which enables the atomized droplets to directly capture the incident solar radiations, leading to droplets evaporation, thereby producing freshwater; and circulating air-vapor mixture within the solar evaporator to maintain a continuous freshwater yield.

In another embodiment of the present invention, air entering the solar evaporator gets heated and humidified within the solar evaporator and makes its way to a direct contact condenser chamber. In another embodiment of the present invention, the solar evaporator further comprises a mesh shaped structure for absorbing solar energy and transferring absorbed heat to the entrained droplets of the air-droplet mixture.

The desalination process in accordance with the present invention operates in ambient conditions, around atmospheric pressure, and within temperature range of 20-60° C. during the day and 15-40° C. during the night. In addition, the supplied seawater in the unit may be preheated subject to thermal energy gain from other external heat sources. The temperature range of seawater entering the system will be between 20-40° C. The solar-evaporator receiver 102 is designed in a way that allows for atomized water droplets to flow in the receiver and capture the solar energy which results in evaporation. This significantly increases the efficiency of the solar energy capturing and reduces losses from the system. The droplets use the solar energy directly to evaporate which keeps the temperature in the solar receiver at a lower value reducing the heat losses. The temperature of air and water droplet may be raised by 5 to 10 degrees in the evaporator. The range of relative humidity existing within the solar evaporating receiver is between 85-100% (since the desalination process is a closed-air circulation system).

In another embodiment of the present invention, the proposed system does not require any kind of electrical components such as PV panels or pumps. It does not require much maintenance as there's no need for regular cleaning of PV module (to avoid the dust badly affecting the efficiency of PV module). The proposed system is simple and easy to operate/maintain with multi-stages of plates, may be easily fabricated and assembled/disassembled. The proposed system operates without any high-pressure pumps or filters (such as in RO). The proposed idea is a passively operating system, operating purely on natural evaporation and condensation cycle and there is no energy wasted for pumps.

Benefits of the proposed portable and direct solar thermal desalination system in accordance with the present invention include the proposed system operating independently and solely on direct solar thermal energy. The system does not require thermal energy from other sources, is operated as a single unit, is easy to operate and has a portable design. No reverse-osmosis filters are used which avoids all complexities related to maintenance and cost. The system does not require any chemicals for the desalination process. It is a cost-effective solution for sea water desalination with low energy consumption. Further advantages of the presently proposed desalination unit include being cost-effective, as the unit operates completely on solar energy, the energy consumption cost of freshwater production is low, overall build-up costs is inexpensive as the system does not include expensive components. Another benefit is being low maintenance (no filter replacements needed), the unit being a stand-alone passive system, wherein the complete solar desalination system is a single unit combining the solar receiver and the evaporator in the same unit. Another advantage includes the proposed system being portable, and its result of producing high quality freshwater, wherein the system generates pure water from direct solar energy capturing and droplets evaporation effectively.

Components of the desalination system such as the solar receiver and evaporator unit, ultrasonic atomizer unit, associated fans and pumps are operated independently of a photovoltaics (PV) solar unit, or in another embodiment—these function along with a PV solar unit.

The proposed invention/system does not require any kind of electrical components such as PV panels or pumps, nor does it require too much maintenance as it does not require regular cleaning of the PV module to avoid the dust that badly affects the efficiency of the PV module. The system is simple and easy to operate or maintain and does not require much maintenance. The proposed idea is simple, easy to manufacture and maintain (assemble/disassemble). The system works without high pressure pumps or any other bulky filters (as in RO). The proposed idea is a passive system and there is no energy wasted on pumps—as the system operates purely on the natural evaporation and condensation cycle.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A portable direct solar desalination system, comprising:
    a solar receiver and evaporator chamber comprising at least one inlet port for water, at least one inlet port for air, and at least one outlet port for air;
    an ultrasonic atomizer positioned within the solar receiver and evaporator chamber for generating atomized droplets inside the solar receiver and evaporator chamber, the solar receiver and evaporator chamber being a solar receiver and solar evaporator combined in a single unit for direct solar energy capturing and evaporation;
    wherein air flows into the solar receiver and evaporator chamber via the at least one inlet port for air, thereby carrying atomized droplets and forming an air-droplet mixture, through the solar receiver and evaporator chamber, wherein entrained droplets of the air-droplet mixture are exposed to solar radiation passing into the solar receiver and evaporator chamber, which enables the atomized droplets to directly capture incident solar radiation, leading to droplets evaporation,
    thereby supplying humidified air into a condenser chamber for condensing water vapor collected from the solar receiver and evaporator chamber into liquid and producing pure distilled water, and
    wherein the ultrasonic atomizer comprises a plurality of ultrasonic atomizers configured to be immersed in a body of seawater within the solar receiver and evaporator chamber.

2. The desalination system of claim 1, wherein the solar receiver and evaporator chamber comprises a complete transparent top cover which allows passage of solar radiation inside.

3. The desalination system of claim 1, wherein ultrasonic waves produced by high frequency vibrating membranes of the ultrasonic atomizer device produce a plurality of microdroplets within the solar receiver and evaporator chamber.

4. The desalination system of claim 1, wherein the solar receiver and evaporator chamber is a basin/unit filled up to a certain specific depth with seawater supplied from a seawater tank.

5. The desalination system of claim 1, wherein the solar receiver and evaporator chamber is a combined/single humidifier chamber.

6. The desalination system of claim 1, wherein the condenser chamber is a direct contact condenser chamber in connection with the solar receiver and evaporator chamber, and a heat recovery chamber.

7. The desalination system of claim 6, wherein humidified air flows out of the solar receiver and evaporator chamber and enters the heat recovery chamber, wherein the heat recovery chamber comprises a heat exchanger which is configured to transfer heat from the humified air to the seawater supplied to the heat exchanger from a seawater tank.

8. The desalination system of claim 7, wherein the heat exchanger is in a form of a helical tube heat exchanger or in a form of air-liquid heat exchanger with fins.

9. The desalination system of claim 7, wherein condensed vapor in the heat recovery chamber is sent to a fresh-water tank.

10. The desalination system of claim 6, wherein the direct contact condenser comprises a plurality of water spray nozzles for distributing cold freshwater, enabling a direct contact vapor condensation, wherein freshwater droplets from the plurality of water spray nozzles trickle down by gravity and exchange heat with the incoming air-droplet mixture, leading to condensation.

11. The desalination system of claim 6, wherein air is circulated between the solar receiver and evaporator chamber and the direct contact condenser via single or multiple fans, wherein a flow rate of the circulated air is set to carry the atomized droplets inside the solar receiver and evaporator chamber.

12. The desalination system of claim 1, wherein at least one outlet port for air includes a filter which allows passage of an air-droplet mixture while preventing the passage of sweater droplets.

13. The desalination system of claim 1, wherein the solar receiver and evaporator chamber further comprises an array of perforated metallic plates for absorbing solar energy and transferring absorbed heat to the entrained droplets of the air-droplet mixture.

14. The desalination system of claim 1, wherein one or more components of the desalination system are powered with electrical input from a photovoltaics (PV) solar unit.

* * * * *